United States Patent [19]
Cook et al.

[11] Patent Number: 5,764,920
[45] Date of Patent: Jun. 9, 1998

[54] SYSTEM AND METHOD FOR ROUTING ADMINISTRATIVE DATA OVER A TELECOMMUNICATIONS NETWORK TO A REMOTE PROCESSOR

[75] Inventors: Fred Samuel Cook, Olathe; Michael Dean Edwards, Lenexa, both of Kans.; Scott Bruce Wilson, San Mateo, Calif.

[73] Assignee: Sprint Communications Co. L.P., Kansas City, Mo.

[21] Appl. No.: 406,086

[22] Filed: Mar. 17, 1995

[51] Int. Cl.⁶ .................................................. G06F 13/00
[52] U.S. Cl. .......................... 395/200.68; 395/182.01; 395/182.02
[58] Field of Search ................. 395/200.15, 182.01, 395/182.02; 370/16, 54; 340/827

[56] References Cited

U.S. PATENT DOCUMENTS

| | | | |
|---|---|---|---|
| 4,308,613 | 12/1981 | Chasek | 370/14 |
| 5,345,229 | 9/1994 | Olnowich et al. | 340/825.8 |
| 5,546,379 | 8/1996 | Thaweethai et al. | 370/17 |

*Primary Examiner*—Daniel H. Pan
*Assistant Examiner*—Walter D. Davis, Jr.
*Attorney, Agent, or Firm*—Harley R. Ball; Jed W. Caven

[57] ABSTRACT

A system and method for routing administrative data over a telecommunications network to a remote processor establishes a connection between a router and the remote processor over a primary link. A processor associated with the router is adapted to detect a predetermined condition and thereupon to automatically reconfigure the router to establish another connection with the remote processor or a connection with another remote processor. The data may be routed over a telecommunications switching network using a router having inverse multiplexing capability. Further, a sockets connection may be established between the associated processor and the remote processor for monitoring the status of the connection between the router and the remote processor to detect a predetermined condition such as a link failure. External customer data may be routed to the system for remote archival purposes. A protocol analyzer may be coupled with the associated processor and the inverse multiplexer to apportion shared costs based on use of shared facilities.

17 Claims, 5 Drawing Sheets

PRIOR ART

SYSTEM AND METHOD FOR ROUTING ADMINISTRATIVE DATA OVER A TELECOMMUNICATIONS NETWORK TO A REMOTE PROCESSOR

BACKGROUND AND SUMMARY OF THE INVENTION

The present invention is directed to the transmission of data to a downstream processor, and more particularly to a system and method for routing administrative data to a downstream processor over a telecommunications switching network.

In the telecommunications field, the term "administrative data" refers broadly to information transported over a telecommunications network including information concerning the operation and use of the network, such as revenue data and traffic data. Call detail records (CDRs), which contain important call-specific billing information, are a well-known type of administrative data. Other examples include data relating to switch loads, alarm conditions, trunk usage, circuit usage and other performance measurements.

Administrative data is typically generated in electronic form at a first network site and then transported over the network to a network destination. In some telecommunications networks, a telecommunications switch generates administrative data and routes the data to a downstream processor over dedicated links. For example, a switch may transmit CDRs over a dedicated link to a local administrative computer, which performs various formatting and processing operations on the data. The data may then be transmitted to one or more intermediate computers for further formatting and processing. Eventually, the administrative data is forwarded to the intended downstream processor, such as a computerized billing system.

For a dedicated network, the operability of each intervening dedicated link and each associated component is essential to successful transmission of the data to its intended destination. If a routing system was transmitting data from a switch to a downstream processor, the flow of data could be halted by either a hardware failure or a link failure. Accordingly, it was desirable to increase the ability of the system to continue transporting data despite link failures and hardware failures, a system characteristic known as "fault tolerance." Since fault tolerant processors and systems were (and continue to be) prohibitively expensive, one prior art approach to increase fault tolerance was simply to provide multiple dedicated paths to the intended destination. Moreover, a router could be adapted to utilize a particular dedicated path from among the multiple dedicated paths, and a modem could be employed to enable an operator to manually reconfigure the router to select a different dedicated path in the event of a link failure.

Nevertheless, the use of multiple dedicated links has presented significant limitations. The reliability of even multiple dedicated links was sometimes insufficient. Such links are often located in close physical proximity to one another (e.g., in the same right-of-way). Thus, a natural disaster such as a flood or tornado could render each of these multiple dedicated links inoperable for an extended period of time. Furthermore, a link failure might go unnoticed for a period of days or even weeks when a particular dedicated link is not in use. Then, when use of the link is required, the link might not be available and considerable difficulty could be involved in locating and repairing the failure long after it has actually occurred.

Another problem in the prior art is the inherent inefficiency of data transmission systems utilizing dedicated links. A dedicated link remains available essentially all of the time, even though actual use of the link may be sporadic. Consequently, the unused capacity of a dedicated link may be substantial, especially if back-up dedicated links are maintained. In some instances, a customer may wish to receive administrative data over a dedicated link. However, the customer will typically be charged for the exclusive use of the dedicated link without regard for the customer's actual usage. Thus, for many applications it is neither cost effective nor efficient to provide redundant dedicated links between a switch and a network destination.

To avoid the limitations of dedicated telecommunications networks, the present invention enables transmission of administrative data over a telecommunications switching network to a downstream processor. The diverse nature of switched links provides for much greater redundancy than multiple dedicated links because alternative routes within the switching network typically follow different physical paths. This diversity stems in part from agreements a number of telecommunications carriers have with one another that permit the selected carrier to route its calls through another carrier's switching network if a switch fails or if some other serious fault occurs. However, the traffic over a switching network may fluctuate significantly and could therefore dictate a more flexible schedule for the routing of administrative data. For example, telecommunications traffic typically peaks during normal business hours but drops off significantly late at night. Traffic over a typical interexchange carrier network could vary from approximately 7,000 calls per minute during the day to about 30 calls per minute at night. Therefore, it may be desirable when utilizing switched links to store the administrative data locally during normal business hours, then use switched links to the network destination at night to transmit the stored administrative data.

A switched connection to the downstream processor may be established over the switching network by coupling a router having inverse multiplexing capability (i.e., an "inverse multiplexer") to the switch. An inverse multiplexer can split a single high speed channel into multiple low speed channels for transporting data over a network. Then, the low speed channels are reassembled at the destination site by a corresponding router having inverse multiplexing capability. Such a router can dial a primary line (or telephone number) and then dial a secondary line if it is unable to establish and maintain a connection with the primary line. Even so, a link failure could go undetected for some time, which would not be acceptable for applications involving mission critical data. Moreover, failures on both lines could prevent transmission of data to the downstream processor.

To utilize additional secondary links, a modem may be coupled with an inverse multiplexer allowing an operator to manually reconfigure the router with instructions to dial another secondary number and thereby reroute the data over a different path. Nevertheless, the mere ability to manually reconfigure a router (with or without inverse multiplexing capability) is not acceptable for a fault tolerant system because a downstream failure still might not be detected for a long period of time and because infrequent use of the connection between the modem and the router makes the system even more susceptible to latent faults. Therefore, in one aspect of the invention, a processor associated with the router is adapted to automatically reconfigure the router to dial a secondary line upon detecting a link failure and to dial alternative secondary lines upon detecting additional link failures.

Further, the associated processor may be provided with a computer program for monitoring the status of the connection between the router and the downstream processor to detect a predetermined condition (e.g., a link or hardware failure). Upon detecting that condition, the processor will reconfigure the router to either redial the same number or dial one or more alternative numbers according to a call profile for the data being transmitted. A call profile provides the router with instructions concerning the routing of data over a switched connection including the desired bandwidth for the call and a list of primary and secondary telephone numbers. Similarly, a computer program may be provided that tests for the presence of a predetermined condition such as a particular time of day or a given level of traffic over the network. If this latter type of condition is detected, the processor may reconfigure the router to dynamically redirect the data to another destination according to the call profile for the data being transmitted.

Accordingly, it is an object of the present invention to provide an inexpensive fault tolerant system and method for routing administrative data to a downstream processor. A related object of the present invention is to transmit administrative data to a downstream processor by routing the data over a telecommunications switching network.

Another object of this invention is to provide a system that is capable of dynamically rerouting administrative data to a remote processor for real-time or near real-time applications.

Yet another object of the present invention is to provide a system for routing administrative data that allows for improved load balancing and increased data transfer rates.

It is a further object of this invention to provide a routing system capable of monitoring the status of the dialable connection between a router and a downstream processor so that faults are detected more quickly. It is a related object of the present invention to reconfigure the router upon detecting a fault or other predetermined condition so that the router will promptly establish another connection with an appropriate downstream processor.

It is yet a further object of this invention to provide a method for the remote archival of data utilizing the disclosed system for routing administrative data.

It is also an object of this invention to provide a protocol analyzer in conjunction with the disclosed system for analyzing communications between remote local area networks.

These and other objects of the present invention will become readily apparent upon further review of the following specification and drawings. To accomplish these and other related objects of the invention, in one aspect the present invention involves a system and method capable of transmitting administrative data from a telecommunications switch to a remote processor over the switching network for increased fault tolerance. The present invention monitors the routing of the data and utilizes multiple switching elements for redundancy so that the system can recover more quickly from faults. In another aspect, the present invention involves using the disclosed routing system as a means for remotely archiving data or as a protocol analyzer for network communications. A preferred embodiment of the present invention utilizes a personal computer coupled and an inverse multiplexer wherein a computer program adapted to run on the personal computer controls the routing of administrative data over the telecommunications switching network depending on the occurrence of a particular triggering event such as a link failure.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION

Figure 1:
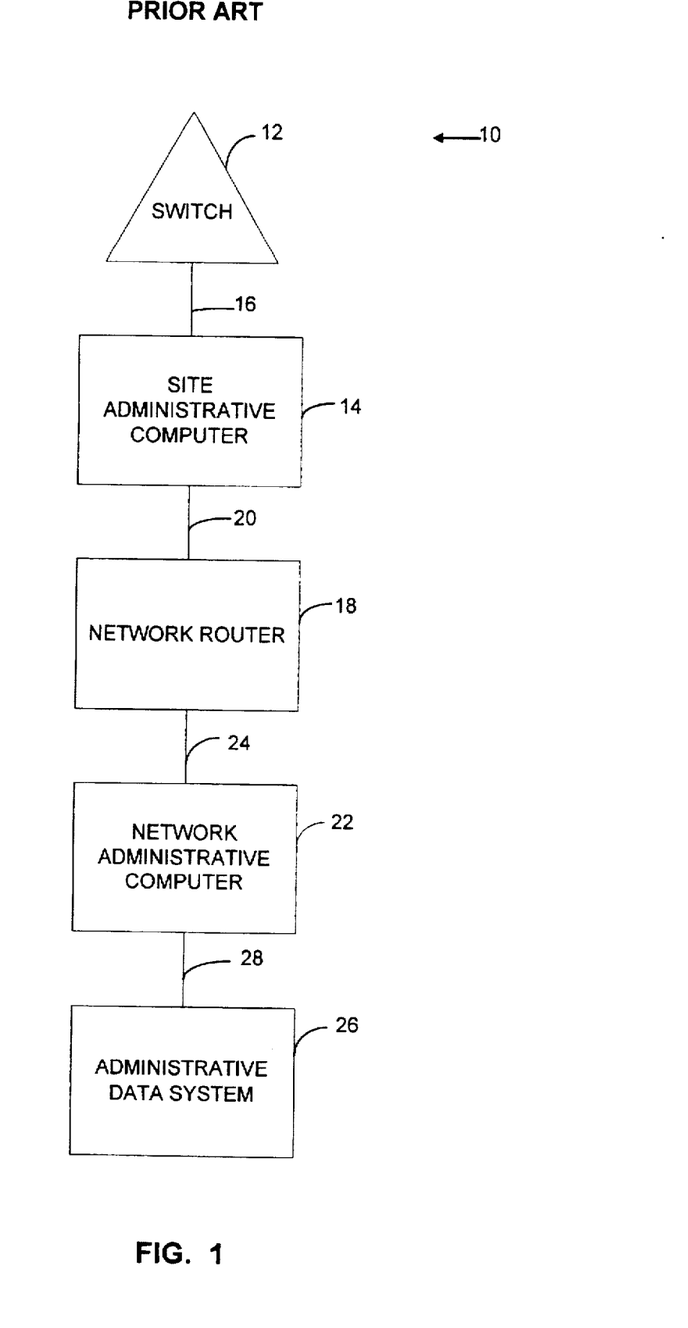
FIG. 1 is a block diagram of a prior art system for routing administrative data over dedicated links from a telecommunications switch to a downstream processor.

Referring initially to FIG. 1, a prior art system 10 for routing administrative data over dedicated telecommunications links is shown. A telecommunications switch 12 generates administrative data, including revenue data and traffic data. Alternatively, such data may be generated elsewhere and delivered to switch 12. The data is then transmitted to a site administrative computer 14 over a link 16 for further processing. Next, the data is forwarded to a network router 18 over a link 20. Network router 18 may comprise a plurality of nodes and data links that eventually transmit the data to a network administrative computer 22 over link 24 for further processing. Links 16, 20 and 24 are administrative links according to a standard such as the well-known X.25 recommendation. Finally, network administrative computer 22 forwards the administrative data to an administrative data system 26 over a link 28 according to the well-known systems Network Architecture (SNA) communication framework. One example of an administrative data system would be a billing system.

It will be appreciated by those skilled in the art that FIG. 1 is a simplified representation of a dedicated system 10 for routing data from switch 12 to administrative data system 26. Typically, there would be a plurality of switches 12 coupled to a plurality of site administrative computers 14 which funnel the administrative data to a plurality of network administrative computers 22 for eventual delivery to at least one administrative data system 26. Most importantly, it is noted that the system of FIG. 1 is a dedicated system that may provide multiple redundant dedicated paths between switch 12 and administrative data system 26.

Figure 2:
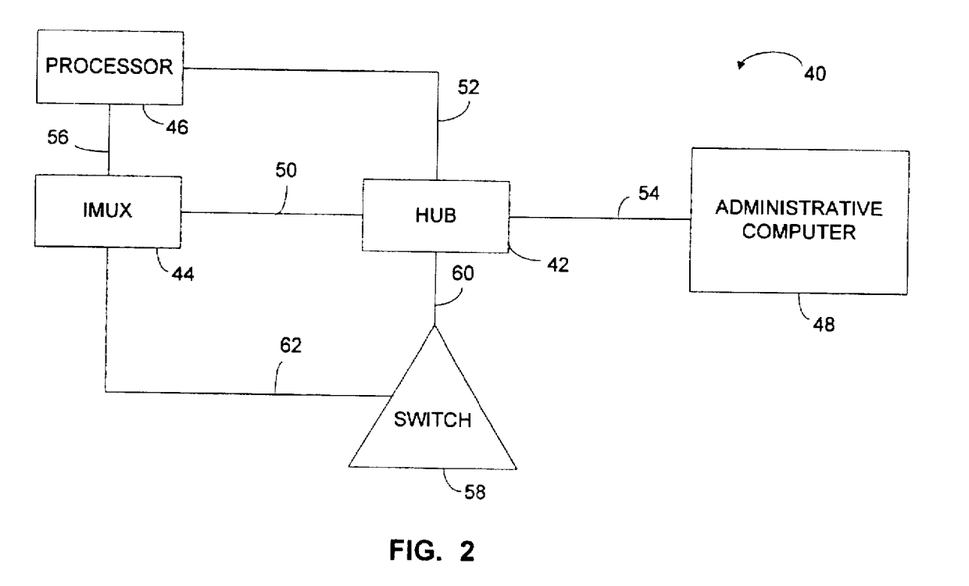
FIG. 2 is a block diagram of a routing system in accordance with a preferred embodiment of the present invention.

In FIG. 2, a routing system 40 is shown in accordance with a preferred embodiment of the present invention. A hub 42 is coupled with a router such as inverse multiplexer (IMUX) 44, an associated processor 46, and an administrative computer 48 by Ethernet links 50, 52 and 54, respectively. Additionally, an asynchronous communication link 56 couples processor 46 with IMUX 44. Hub 42 is connected to a telecommunications switch 58 by administrative lines 60, and IMUX 44 is connected to switch 58 by communications lines 62. Thus, a local area network (LAN) may be formed within system 40.

Figure 3:
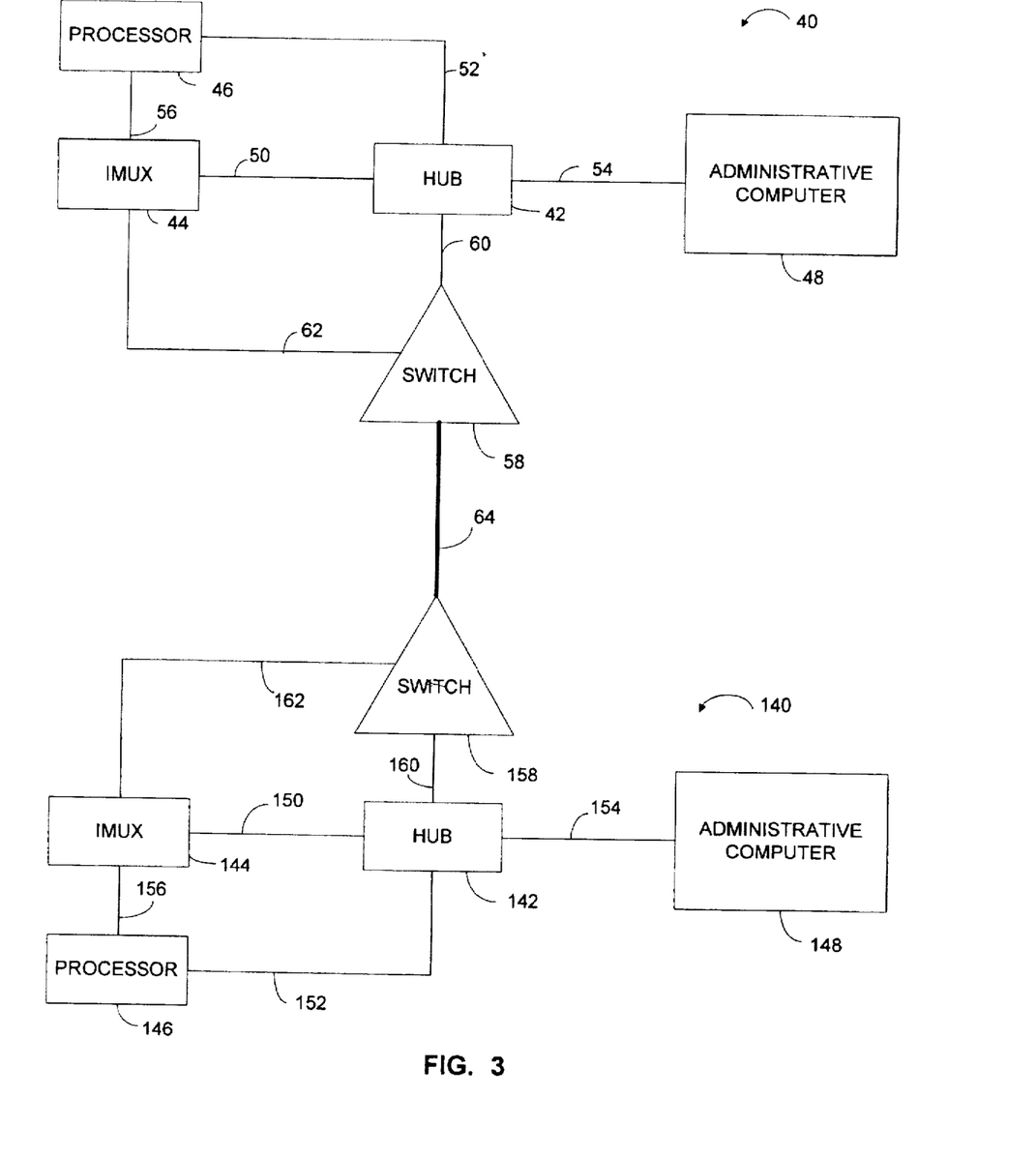
FIG. 3 is a block diagram of a telecommunications switching network coupling the routing system of FIG. 2 with another routing system in accordance with a preferred embodiment of the present invention.

FIG. 3 illustrates the relationship between system 40 and other routing systems, such as routing system 140, with respect to the telecommunications switching network. While system 40 is associated with switch 58, system 140 is associated with switch 158. Inter-switch trunks 64 connect switch 58 with switch 158 for bilateral communication over the switching network between switch 58 and switch 158 and therefore between system 40 and system 140. System 140 comprises a hub 142 coupled with an IMUX 144, an associated processor 146, and a downstream administrative computer or node 148 by Ethernet links 150, 152, and 154, respectively. There is also an asynchronous communication link 156 coupling processor 146 with IMUX 144. Hub 142 is connected to telecommunications switch 158 by administrative lines 160, and IMUX 144 is connected to switch 158 by communications lines 162. As in system 40, a LAN may be formed within system 140. Moreover, a wide area network (WAN) may be formed when these two LANs communicate with one another.

In a preferred embodiment of the present invention, data is transferred from switch 58 to hub 42 over administrative lines 60, then to IMUX 44 over high speed link 50. Associated processor 46 communicates with IMUX 44 over asynchronous link 56 to control the routing of the data over the switching network such as by providing or configuring call profiles for the data. A call profile may indicate primary and secondary telephone numbers and a desired bandwidth for each call. Moreover, a call profile may include values associated with a number of relevant parameters as determined by those skilled in the art. Based on the information in an activated call profile, IMUX 44 will dial up an appropriate network destination using dual tone multi-frequency (DTMF) signals over links 62. Those skilled in the art will recognize other methods of dialing such as a pulse or a signaling message. The term dialing is used in the context of the present invention to comprise any method of providing a telecommunications device with a telephone number, a routing number, or a routing code. These signals are recognized by switch 58 as an incoming telephone call, and the call is then routed over a digital switching network to the appropriate network destination. Accordingly, the call is routed over trunks 64 to switch 158, over lines 162 to IMUX 144, over link 150 to hub 142, and finally over link 154 to remote node 148.

Upon establishing a connection between IMUX 44 and remote node 148, transfer of data will commence. However, if a connection is not established between IMUX 44 and node 148, IMUX 44 may either redial the primary number or attempt to establish a connection by dialing a secondary number. As known to those skilled in the art, node 148 may have a plurality of ports capable of receiving outside calls, but each port is not necessarily assigned a unique telephone number. Therefore, redialing the same number may result in a connection with a different port at node 148. Similarly, each secondary number in a call profile may represent another port at the same node or may direct the call to an alternative remote node.

After a connection is established between IMUX 44 and remote node 148, associated processor 46 will establish a sockets connection with node 148 to monitor the status of the switched connection that was dialed-up between IMUX 44 and node 148. As will be appreciated by those skilled in the art, a socket at node 148 is an application interface that allows for higher level communication with processor 46 over the same circuit at the same time node 148 is communicating with IMUX 44. Processor 46 may establish a sockets connection over Ethernet link 52, through hub 42, over Ethernet link 50, through IMUX 44 and over the switched connection between IMUX 44 and node 148 so that both ends of the sockets connection are Ethernet links. As long as the sockets connection is up, then the switched connection must also be up because the switched link is preferably an essential, intervening link of the sockets connection. On the other hand, if the switched connection between IMUX 44 and node 148 goes down, the sockets connection between processor 46 and node 148 will also go down. In the latter case, processor 46 may instruct IMUX 44 to hang up and, depending on the call profile, either redial the primary number or dial a secondary number. Use of the well-known Transmission Control Protocol/Internet Protocol (TCP/IP) assures end-to-end transmission of data over these connections.

Figure 4:
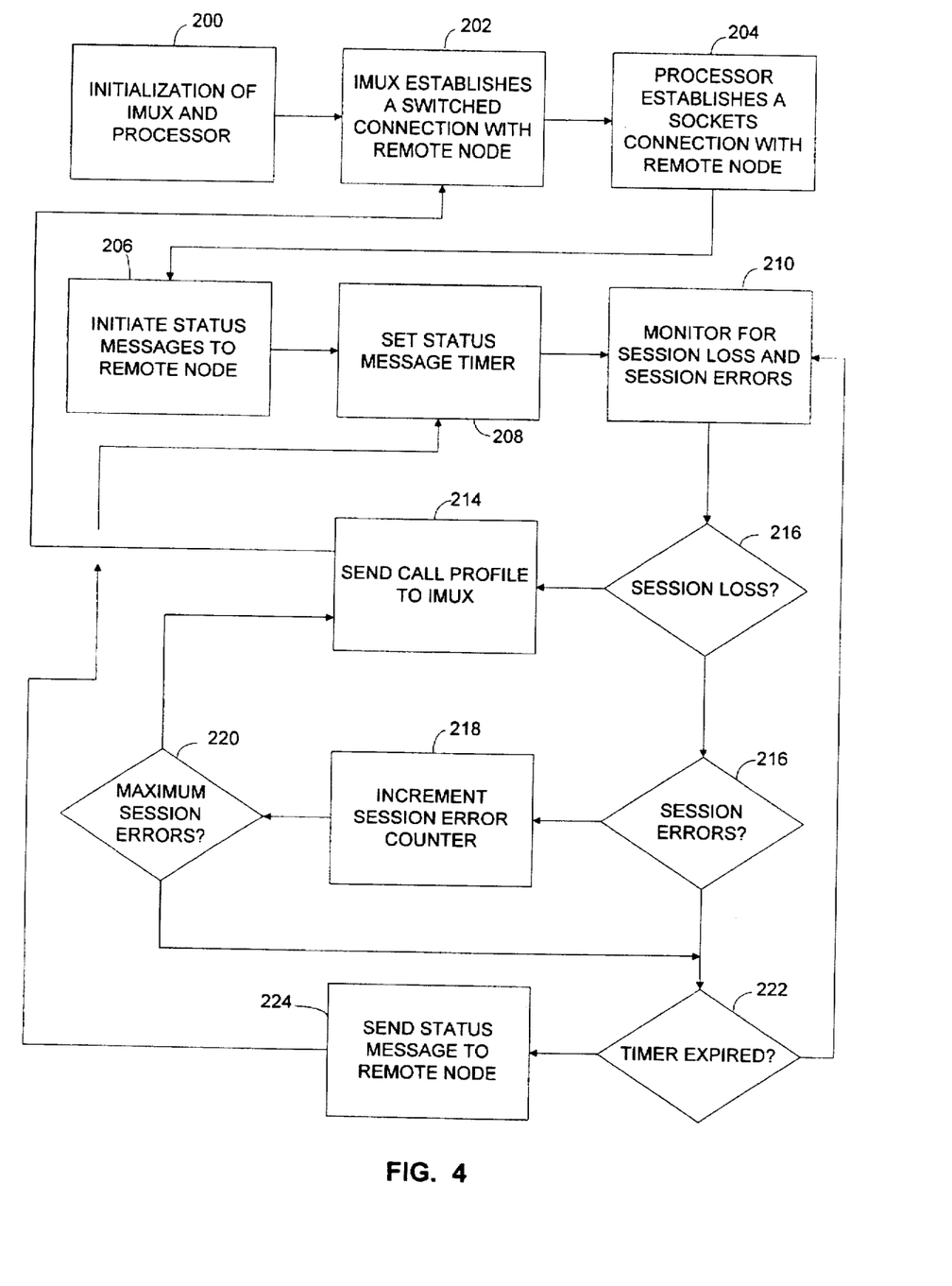
FIG. 4 is a flow chart representative of a computer program used in conjunction with a preferred embodiment of the routing system of the present invention.

Referring next to FIG. 4, a flow chart is provided that is representative of a computer program for monitoring a switched connection. The program is preferably written in the C programming language to run on associated processor 46. At step 200, IMUX 44 and processor 46 are initialized upon turning on the power. A typical initialization routine might involve setting variables to predetermined beginning or default values, resetting registers and other similar operations. Then, IMUX 44 establishes a dialable connection with remote node 148 via links 62 at step 202. Next, at step 204, processor 46 establishes a sockets connection with remote node 148. After the sockets connection is established, the program begins to send status messages (e.g., "I'm alive" messages) to remote node 148 in step 206. A timer is set at step 208 so that status messages may be sent from processor 46 to node 148 periodically at selected intervals. Although it may be desirable for node 148 to expressly acknowledge receipt of the status message from processor 46, that step is not necessary if the protocol governing the sockets connection will send an error message to processor 46 whenever a status message is not properly received at node 148. Therefore, as soon as the switched connection goes away, an error message will be sent from node 148 to processor 46.

At step 210, the program watches for session loss and session errors for the dialable connection with the remote node 148. If a session loss is detected at step 212, then step 214 of the program will prompt processor 46 to send a call profile to IMUX 44 before returning to step 202. If no session loss is detected, the program advances to step 216 and watches for session errors. Session errors may include garbled transmission, interference or noise on the line, or error messages from the network protocol. For each error that is detected, step 218 increments the session error counter and determines at step 220 whether a predetermined maximum number of allowable errors has occurred. If too many errors have occurred, the program advances to step 214 and processor 46 sends a call profile to IMUX 44 before the program returns to step 202. If no session errors are detected, or if the number of session errors detected is at or below the maximum number of allowable errors, the program advances to step 222 to determine whether the timer has expired. If the timer has not expired, the program will loop back to step 210 and continue to watch for session loss and session errors. However, if the timer has expired, then the program advances to step 224 to send another status message to remote node 148, and the timer is reset at step 208. The program will continue to execute as described above as long as IMUX 44 is attempting to transmit data to remote node 148.

Administrative data may be generated at a switch, or it may be generated elsewhere and transmitted to a switch (e.g., over T1 links comprising multiple voice and data channels) for further processing. Moreover, the administrative data may be generated internally (within the telecommunications network) or externally (outside the telecommunications network). One example of externally-generated administrative data is customer data that is generated at a customer site and archived at a remote storage location within a telecommunications network. Both internal and external data may be forwarded from switch 58 to local computer 48 over lines 60 or routed from switch 58 to remote node 148 over the switching network.

Oftentimes it is not critical for the administrative data to be transmitted to a final destination as soon as it is generated. Thus, it may be desirable to store the administrative data locally, and transfer the data when traffic or costs are lower. If so, the data may be stored temporarily at processor 46, computer 48 or some other store-and-forward location.

Processor 46 may also control the transfer rate of data through IMUX 44 by specifying the number of voice/data channels in link 62 for a particular set of data. For example, if link 62 is a T1 line comprised of 24 channels each operating at 64 kilobits per second (kbps), processor 46 may specify that a particular set of data will be routed over eight of these channels based on their availability. In other words, the same data set may be transmitted over one channel, or it may occupy multiple channels connected to a single destination for a proportionately faster transfer of data. One way that IMUX 44 may seize multiple channels for a single call is by dialing the same number over and over again until the desired bandwidth has been obtained. Similarly, IMUX 44 may have an overflow mode in which it can dial-up additional bandwidth on demand, even if the existing bandwidth is over dedicated links. Therefore, greater bandwidth may be utilized on demand to obtain greater rates of data transfer.

A particularly useful application of the present invention involves the routing of telecommunications billing data to a billing system. Previously, billing data has been routed from each telecommunications switch to the billing system through a variety of dedicated links. By contrast, the present invention enables the routing of billing data over switched connections to the billing system. Alternatively, the present invention may provide for dialable connections in addition to an existing dedicated system. In either case, the system of the present invention does not require a significant investment in additional hardware because it primarily utilizes existing telecommunications switches and links.

A further advantage of routing billing data over switched links as described above is the ability to provide customers with CDR information in real-time or near realtime by dynamically redirecting the routing of the data. For example, a customer that places an advertisement encouraging consumers to dial a telephone number (e.g., an 800 number) can promptly obtain call detail statistics (e.g., the telephone number of the line initiating the call) from the carrier for the calls placed to that number following the advertisement. Otherwise, it could take several weeks or more to obtain the same information if the carrier routes billing information over dedicated links.

Figure 5:
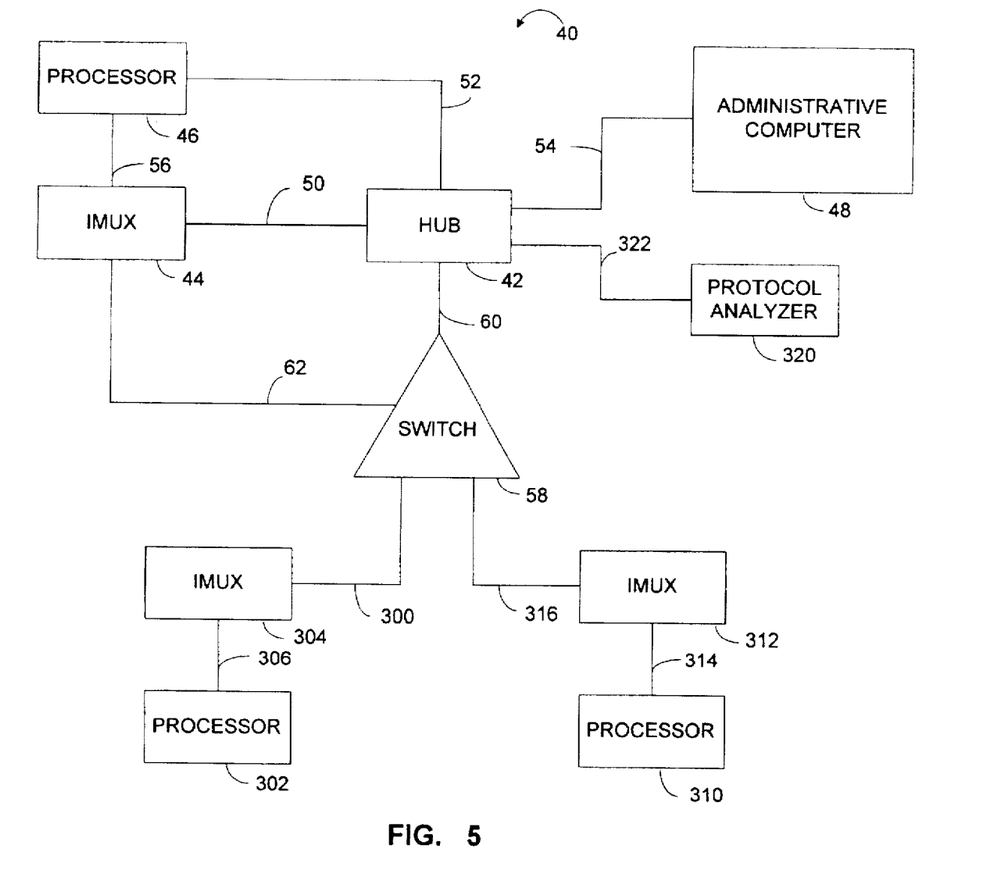
FIG. 5 is a block diagram of the routing system shown in FIG. 2 coupled with a protocol analyzer and illustrates the relationship of external customer processors to the routing system in accordance with the present invention.

Another application of the present invention is remote archival of external data. More particularly, a customer with limited computer resources may choose to periodically back up their data by leasing storage space from a carrier employing the present invention. Referring to FIG. 5, a customer having a link 300, such as a dedicated access line (DAL) or T1 line, could allocate most of their T1 channels for telephone calls during the day, and the remaining channels could be used for transmitting data from the external customer's processor 302 to a remote location such as processor 46 or administrative computer 48. At night, the channels of the T1 line could be used primarily for remotely archiving data. Therefore, the customer can back up their data throughout the day and/or at night by using an IMUX 304 to transmit the data over their existing link 300 rather than paying for the use of an additional link. This arrangement can be mutually cost effective if the customer is merely billed on a per call basis while the carrier is generating revenue from previously unused capacity.

Customer data stored on processor 302 would be transmitted over a link 306 to IMUX 304, over link 300 to switch 58, over link 62 to IMUX 44, and through hub 42 to either processor 46 or computer 48. If the customer later needs the archived data for whatever reason, the data can be transmitted back to processor 302 or to any other destination, such as an external processor 310. Processor 310 is coupled to an IMUX 312 over a link 314, and IMUX 312 is coupled to switch 58 by a link 316.

A further application for the present invention, also shown in FIG. 5, utilizes a protocol analyzer 320 coupled to hub 42 over a link 322. Protocol analyzers are currently used for error analysis and throughput with LANs. However, protocol analyzer 320 may be coupled with IMUX 44 and processor 46 to determine information such as the quantity of data sent by a particular network address in a remote LAN. Consequently, the present invention has the ability to determine what percentage of data lines were used by each node in a shared network and bill the shared costs accordingly. In other words, traffic flow for a remote LAN may be specifically determined by breaking the LAN's T1 line into segments and taking readings therefrom to obtain a departmental cost analysis. This approach is more efficient than the prior art practice of providing individual T1 links for each combination of network addresses.

For example, if customer processors 302 and 310 (each represent a LAN, then LAN 302 and. LAN 310 can communicate with one another through switch 58. By routing these communications through IMUX 44, analyzer 320 can monitor the communications and analyze the traffic flow for each network address for LAN 302 and for LAN 310.

As would be readily apparent to one of ordinary skill in the art, various combinations of hardware and software may be utilized within the scope of the present invention. For associated processor 46, it is presently preferred to use a personal computer such as an IBM-compatible 486 personal computer with an Intel 486 microprocessor, but many other processors such as a minicomputer or a mainframe could also perform the requisite functions adequately. Furthermore, processor 46 is programmatically interfaced with IMUX 44 so that the programming may actually reside at either location, and IMUX 44 could be embodied as a card in processor 46. If a personal computer is employed, a keyboard and monitor are not essential for processor 46 in the context of the present invention. It is presently preferred that IMUX 44 is a Pipeline MAX series router manufactured by Ascend Communications, Inc. of Alameda, Calif. However, a number of other routers and inverse multiplexers of varying sophistication are known to those skilled in the art and would be suitable for use in the present invention. For example, an Ascend Multiband inverse multiplexer is not Ethernet compatible, so an Ethernet to V.35 converter box could be coupled with that IMUX to provide the Ethernet to T1 interface of the present invention.

Similarly, there are a number of protocols and specifications available for each of the communications links. Links 50, 52, and 54 are administrative lines that interconnect IMUX 44, processor 46, and administrative computer 48, and preferably form an Ethernet LAN. However, a number of other acceptable network topologies or configurations would be readily apparent to those skilled in the art. Link 56 is an asynchronous link for communication between processor 46 and IMUX 44. Link 60 may be an X.25 or Ethernet link, or some other link capable of transmitting administrative data from switch 58 to hub 42. Lines 62 may be 56 kbps lines, 64 kbps lines, fractional T1 lines, T1 lines, or some other link that facilitates a switched connection from IMUX 44 to a remote location over the switching network. Interswitch trunks 64 are communication links that connect one telecommunications switch to another telecommunication switch as shown in FIG. 3.

Although the preferred embodiment includes a hub 42 and an administrative computer 48, neither is required for the present invention. For example, hub 42 may be omitted if administrative lines are connected to both IMUX 44 and processor 46. This could be accomplished, for example, by splitting lines 60 into a "T" configuration. Administrative computer 48 primarily provides additional storage and processing capability and is therefore optional in system 40.

Switches 58 and 158 are preferably conventional telecommunications switches such as the DMS-250 switch manufactured by Northern Telecom, but other switches that are equally applicable to the present invention will be apparent to those skilled in the art. For a conventional switch, the administrative data is routed to an inverse multiplexer, which dials up the appropriate downstream processor. Accordingly, the data will be sent back through the switch and over the switching network to the downstream processor. Alternatively, the functionality of system 40 could be integrated within a customized switch if desired. According to this alternative embodiment, a customized switch incorporating the present invention could directly route the administrative data over the switching network to a remote processor without first transmitting the data to an external routing system such as system 40.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A routine system for transmitting administrative data to a remote processor over a telecommunications switching network, said routing system comprising:
   an inverse multiplexer adapted to receive administrative data and further adapted to route the data to a remote processor over the telecommunications switching network;
   an associated processor, coupled to said inverse multiplexer, for controlling the routing of the administrative data over the switching network by configuring said inverse multiplexer to establish a connection with the remote processor by dialing a primary line for transmitting the data to the remote processor; and
   means for monitoring the status of the connection between said inverse multiplexer and the remote processor to detect a predetermined condition, wherein said monitoring means includes a computer program adapted to establish a sockets connection between said associated processor and the remote processor.

2. The system of claim 1, further comprising means for automatically reconfiguring said inverse multiplexer, upon detecting the predetermined condition, to establish a connection with the remote processor by redialing the primary line.

3. The system of claim 1, further comprising means for automatically reconfiguring said inverse multiplexer, upon detecting the predetermined condition, to establish a connection with the remote processor by dialing a secondary line.

4. The system of claim 1, further comprising means for automatically reconfiguring said inverse multiplexer, upon detecting the predetermined condition, to establish a connection with an alternative remote processor by dialing a secondary line.

5. The system of claim 1, wherein the predetermined condition is an inability to communicate with the remote processor.

6. The system of claim 1, further comprising means for sending a status message to the remote processor over the sockets connection to determine the status of the connection between said inverse multiplexer and the remote processor.

7. The system of claim 1, wherein said associated processor is a personal computer.

8. The system of claim 1, wherein said processor configures said inverse multiplexer based on a call profile associated with the data to be transmitted.

9. A method of routine administrative data over a telecommunications switching network to a downstream processor, said method comprising:
   providing administrative data to an inverse multiplexer;
   dialing a primary line to establish a switched connection between the inverse multiplexer and the downstream processor for routine the data to the downstream processor over the switching network;
   establishing a sockets connection between the downstream processor and a processor associated with the inverse multiplexer to monitor the status of the switched connection; and
   monitoring the status of the connection between the associated processor and the downstream processor to detect a predetermined condition.

10. The method of claim 9, further comprising redialing the primary line upon detecting the predetermined condition.

11. The method of claim 9, further comprising dialing a secondary line, upon detecting the predetermined condition, to establish a switched connection between the inverse multiplexer and the downstream processor for routing the data to the downstream processor over the switching network.

12. The method of claim 9, further comprising dialing a secondary line, upon detecting the predetermined condition, to establish a switched connection between the inverse multiplexer and an alternative downstream processor for routing the data to the alternative downstream processor over the switching network.

13. The method of claim 9, wherein the predetermined condition is a session loss.

14. The method of claim 9, wherein the predetermined condition is a number of session errors exceeding a maximum number of allowable session errors.

15. The method of claim 9, wherein the switched connection is an intervening link in the connection between the associated processor and the downstream processor.

16. The method of claim 9, further comprising dialing up additional bandwidth for the switched connection between the inverse multiplexer and the downstream processor.

17. The method of claim 9, wherein the switched connection represents additional bandwidth for an existing connection over a dedicated link.

* * * * *